US011510493B1

(12) United States Patent
Thompson (10) Patent No.: US 11,510,493 B1
(45) Date of Patent: Nov. 29, 2022

(54) HUNTING CHAIR

(71) Applicant: Tim Thompson, Bowdon, GA (US)

(72) Inventor: Tim Thompson, Bowdon, GA (US)

( * ) Notice: Subject to any disclaimer, the term of this patent is extended or adjusted under 35 U.S.C. 154(b) by 0 days.

(21) Appl. No.: 17/730,249

(22) Filed: Apr. 27, 2022

(51) Int. Cl.
| *A47C 7/00* | (2006.01) |
| *A47C 4/28* | (2006.01) |
| *A47C 4/44* | (2006.01) |
| *A47C 5/10* | (2006.01) |
| *A47C 9/10* | (2006.01) |
| *A01M 31/02* | (2006.01) |
| *A47C 7/28* | (2006.01) |
| *A47C 4/20* | (2006.01) |
| *A47C 5/04* | (2006.01) |
| *A47C 3/023* | (2006.01) |

(52) U.S. Cl.
CPC .............. *A47C 7/008* (2013.01); *A01M 31/02* (2013.01); *A47C 3/023* (2013.01); *A47C 4/20* (2013.01); *A47C 4/28* (2013.01); *A47C 4/44* (2013.01); *A47C 5/04* (2013.01); *A47C 5/10* (2013.01); *A47C 7/282* (2013.01); *A47C 9/10* (2013.01)

(58) Field of Classification Search
CPC .. A47C 3/023; A47C 4/20; A47C 4/28; A47C 4/44; A47C 5/04; A47C 5/10; A47C 7/008; A47C 9/10; A01M 31/00–025
USPC ............ 297/16.1, 16.2, 45, 337, 338, 446.1, 297/446.2, 451.3, 451.9; 182/116, 124, 182/182; 224/153, 155, 165
See application file for complete search history.

(56) References Cited

U.S. PATENT DOCUMENTS

| 1,901,641 | A | * | 3/1933 | Goldblatt | A61G 1/04 5/628 |
| 1,923,617 | A | * | 8/1933 | Edensword | A61G 7/1003 5/81.1 R |
| 2,820,509 | A | * | 1/1958 | Moreland | A47C 4/48 297/183.5 |
| 3,067,975 | A | * | 12/1962 | Wilcox | A01M 31/02 248/230.8 |
| 3,208,795 | A | * | 9/1965 | Schultz | A47C 5/12 108/150 |
| 3,264,033 | A | * | 8/1966 | Hansburg | A47C 16/025 D6/349 |
| 3,336,999 | A | * | 8/1967 | Mcswain | A45F 3/26 182/20 |
| 3,709,559 | A | * | 1/1973 | Rowland | A47C 7/285 297/448.1 |
| 3,866,250 | A | * | 2/1975 | Bradford | A47C 20/043 5/652 |
| 3,912,138 | A | * | 10/1975 | Pava | A45F 4/04 24/453 |
| 4,029,278 | A | * | 6/1977 | Napoleon | A47C 7/008 248/164 |
| 4,109,961 | A | * | 8/1978 | Opsvik | A47D 11/02 D6/350 |
| 4,148,376 | A | * | 4/1979 | Campbell, Jr. | A45F 3/04 182/20 |
| 4,241,950 | A | * | 12/1980 | Simpson | A47C 4/24 297/18 |

(Continued)

*Primary Examiner* — Robert Canfield
(74) *Attorney, Agent, or Firm* — Georgiy L. Khayet (57) ABSTRACT

A hunting chair is provided. The hunting chair includes a seat, a seat support structure coupled to the seat at an angle, and a back support. The seat support structure consists of two legs and at least one cross rail connecting the two legs. The back support is positioned between the two legs above the seat.

18 Claims, 10 Drawing Sheets

(56) References Cited

U.S. PATENT DOCUMENTS

| | | | | |
|---|---|---|---|---|
| 4,358,866 A * | 11/1982 | Rhodes | A47C 15/006 | 441/35 |
| 4,836,938 A * | 6/1989 | Kobasic | A01M 31/02 | 224/155 |
| D306,379 S * | 3/1990 | Kobasic | D6/334 | |
| 5,058,948 A * | 10/1991 | Singer | A47C 4/24 | 297/18 |
| 6,017,089 A * | 1/2000 | Mengshoel | A47C 3/28 | 297/331 |
| 6,155,646 A | 12/2000 | Sisson | A01M 31/02 | 248/407 |
| 6,464,118 B2 * | 10/2002 | McUmber | A45F 4/02 | 224/155 |
| 7,052,080 B2 * | 5/2006 | Knight | A45F 4/02 | 297/452.64 |
| 8,833,518 B2 * | 9/2014 | Holcombe | A01M 31/02 | 297/440.1 |
| 10,064,403 B2 * | 9/2018 | Shiver | E06C 1/39 | |
| 10,405,662 B2 * | 9/2019 | Cohen | A47C 4/28 | |
| 2002/0100778 A1 * | 8/2002 | McUmber | A45F 4/02 | 224/155 |
| 2002/0145311 A1 * | 10/2002 | Haubeil | A01M 31/02 | 297/451.3 |
| 2008/0149422 A1 * | 6/2008 | Lott | A01M 31/02 | 297/118 |
| 2010/0133303 A1 * | 6/2010 | Schilly | A45F 3/047 | 224/155 |
| 2015/0157008 A1 * | 6/2015 | Sunday | A47C 4/22 | 297/217.1 |
| 2015/0181860 A1 * | 7/2015 | Johnson | A01M 31/02 | 182/187 |
| 2015/0313330 A1 * | 11/2015 | Stevens | A47C 3/00 | 297/440.1 |
| 2018/0027970 A1 * | 2/2018 | Frankel | A47C 4/48 | |
| 2020/0344997 A1 * | 11/2020 | Berkbuegler | A01M 31/02 | |
| 2020/0383314 A1 * | 12/2020 | Overbaugh | A01M 31/02 | |

* cited by examiner

HUNTING CHAIR

TECHNICAL FIELD

This disclosure relates to seating and chairs for outdoor use. More specifically, this disclosure relates to hunting chairs.

BACKGROUND

Chairs are used by hunters while waiting at a vantage point. A hunter may spend considerable time seating in a chair waiting for an opportunity to shoot. Therefore, a hunting chair needs to be comfortable for the hunter and enable the hunter to stay still for a long time without creating excessive noise. Conventional hunting chairs are four-legged chairs, which may be foldable to occupy less space during transportation. Four-legged chairs are convenient for using on even surfaces. However, areas used for hunting often uneven, such as hills and slopes. When used on slope surfaces, a conventional four-legged hunting chair can be uncomfortable for the hunter because the plane of the seat would be sloped as well.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to hunting chairs and methods for manufacturing hunting chairs. According to one example embodiment of the present disclosure, a hunting chair is provided. The hunting chair may include a seat, a seat support structure coupled to the seat at an angle, and a back support. The seat support structure may consist of two legs and at least one cross rail connecting the two legs. The back support may be positioned between the two legs of the chair above the seat.

According to a further example embodiment of the present disclosure, a method for manufacturing a hunting chair is provided. The method may commence with providing a seat. The method may further include providing a seat support structure coupled to the seat and forming an angle with the seat. The seat support structure may consist of two legs and at least one cross rail connecting the two legs. The method may further include providing a back support positioned between the two legs of the chair above the seat.

Other example embodiments of the disclosure and aspects will become apparent from the following description taken in conjunction with the following drawings.

BRIEF DESCRIPTION OF DRAWINGS

Embodiments are illustrated by way of example and not limitation in the figures of the accompanying drawings, in which like references indicate similar elements.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure are concerned with hunting chairs and methods for manufacturing hunting chairs. A hunting chair of the present disclosure has two legs, a seat, and a back support interconnected to each other. With two legs only, the hunting chair can be used both on a sloped or level terrain, at an angle convenient for sitting and can be easily set up on a terrain sloped at any direction. The hunting chair disclosed herein is intended mainly for ground hunting purposes. In some embodiments, the hunting chair can be used to lean up against a tree. In other embodiments, with certain soil conditions, the legs of the hunting chair can be inserted into the soil and the hunting chair can be freestanding without the need to lean against anything. Furthermore, the hunting chair does not need any means for hanging the hunting chair on a tree because the hunting chair can stand on its own.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

Figure 1:
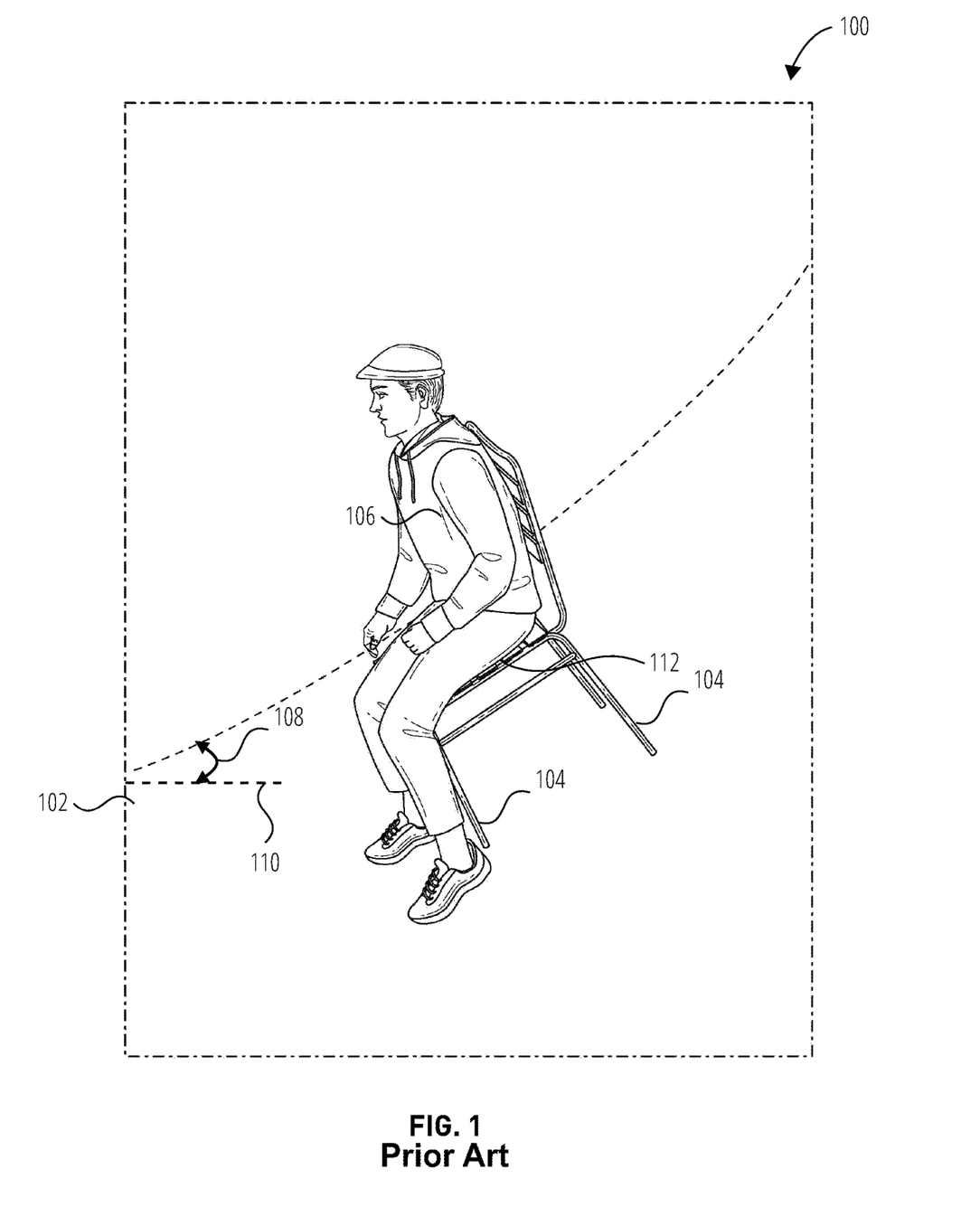
FIG. 1 is a general view of a conventional hunting chair on a slope surface, according to an example embodiment.

FIG. 1 a general view of a conventional hunting chair 100 on a slope surface 102, according to an example embodiment. Hunters often use hunting chairs when waiting for animals to appear. The slope surface 102 in an area where a person 106 wants to sit on the conventional hunting chair 100 while waiting for an animal and can be positioned at an angle 108 with respect to a horizontal surface 110.

The conventional hunting chair 100 has four legs 104. When the legs 104 of the conventional hunting chair 100 are placed on the slope surface 102, the conventional hunting chair 100 has an inclined position. Specifically, a seat 112 of the conventional hunting chair 100 may be disposed at the angle 108 with respect to the horizontal surface 110. It can be uncomfortable for the person 106 to sit on the conventional hunting chair 100 with the seat 112 inclined with respect to the horizontal surface 110. Furthermore, because the conventional hunting chair 100 has four legs 104 in contact with the slope surface 102, it is impossible for the conventional hunting chair 100 placed on the slope surface 102 to have a substantially horizontal position of the seat 112. Therefore, the conventional hunting chair 100 with four legs 104 has limited application for slope surfaces 102.

Figure 2:
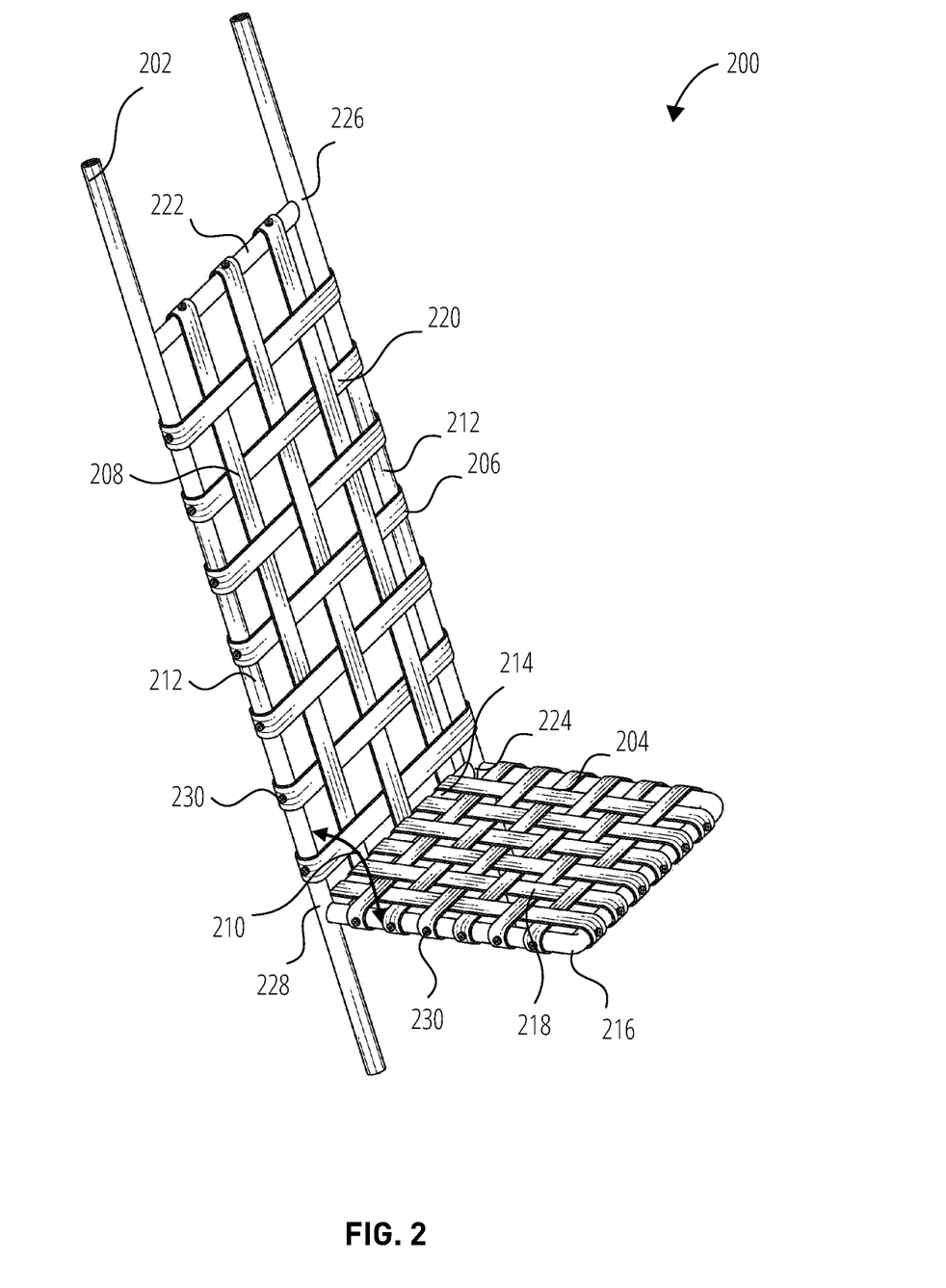
FIG. 2 is a front perspective view of a hunting chair, according to an example embodiment.
Figure 3:
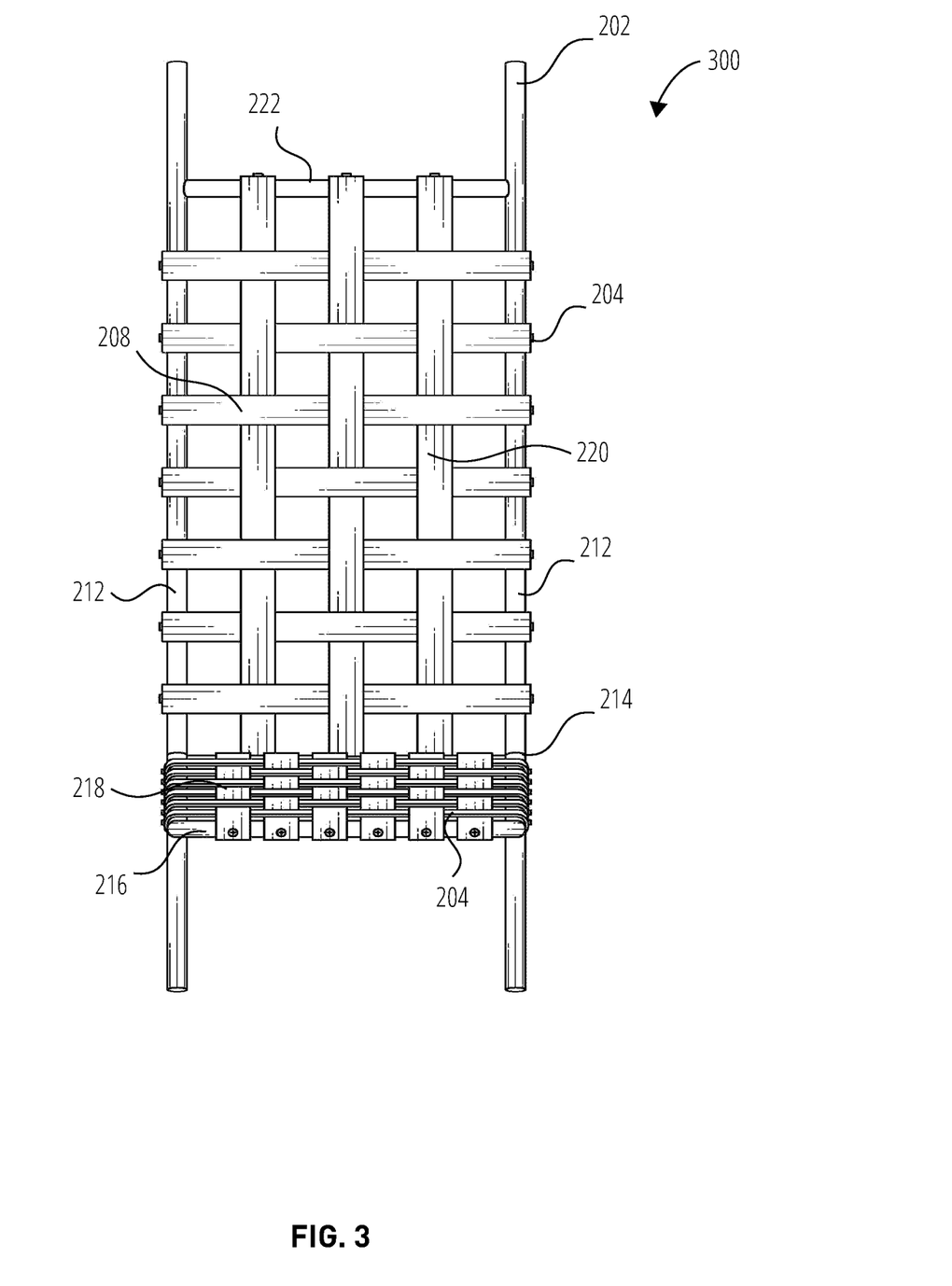
FIG. 3 is a front view of a hunting chair, according to an example embodiment.

FIG. 2 and FIG. 3 illustrate a hunting chair of the present disclosure, according to an example embodiment. FIG. 2 is a front perspective view 200 of a hunting chair, according to an example embodiment. FIG. 3 is a front view 300 of a hunting chair, according to an example embodiment.

A hunting chair 202 may include a seat 204, a seat support structure 206, and a back support 208. The seat support structure 206 may be coupled to the seat 204 at an angle 210. In an example embodiment, the angle 210 may be a predetermined angle ranging about 80 to about 130 degrees. The seat support structure 206 may consist of two legs 212 and at least one cross rail 214 connecting the two legs 212. The seat 204 may include a frame 216 and a textile 218 stretched onto the frame 216. The back support 208 may be positioned between the two legs 212 above the seat 204.

In an example embodiment, the seat support structure 206 may further include a crossbar 222. The crossbar 222 may be connected to each of the two legs 212. Specifically, as shown in FIG. 2 and FIG. 3, the crossbar 222 may be connected to each of the two legs 212 in an upper portion 226 of the two legs 212, while the at least one cross rail 214 may be connected to each of the two legs 212 in a lower portion 228 of the two legs 212.

The frame 216 of the seat 204 may be connected to the two legs 212. Specifically, the frame 216 may be connected to a portion 224 of the two legs 212 where the at least one cross rail 214 is connected to the two legs 212.

In an example embodiment, the two legs 212 and the at least one cross rail 214 may include tubes. The tubes may be made of a metallic material covered by a rubber material. Because the metallic material may make noise coming in contact or impacted by different objects, covering the metallic material with the rubber material may considerably reduce or eliminate the noise. In some example embodiments, the tubes can be made of a composite polymer material to reduce or eliminate the noise. The composite polymer material may include, for example, an acrylonitrile-acrylic rubber-styrene copolymer.

In an example embodiment, the back support 208 of the hunting chair 202 may include a textile webbing 220. In some example embodiments, the back support 208 may include a solid stretchable textile material.

In an example embodiment, the textile 218 of the seat 204 and the textile webbing 220 of the back support 208 may include a solid material, trampoline materials (e.g., polypropylene), mesh material, cotton-type material, and so forth. Furthermore, the material used for seat 204 may include a first membrane and the material used for the back support 208 may include a second membrane, and both the first membrane and the second membrane can be perforated to make the membranes more flexible.

In an example embodiment, the textile webbing 220 may be connected to the back support 208 (i.e., to the two legs 212, crossbar 222, and at least one cross rail 214) using fasteners 230. Similarly, the textile 218 can be connected to the frame 216 of the seat 204 using the fasteners 230.

Figure 4:
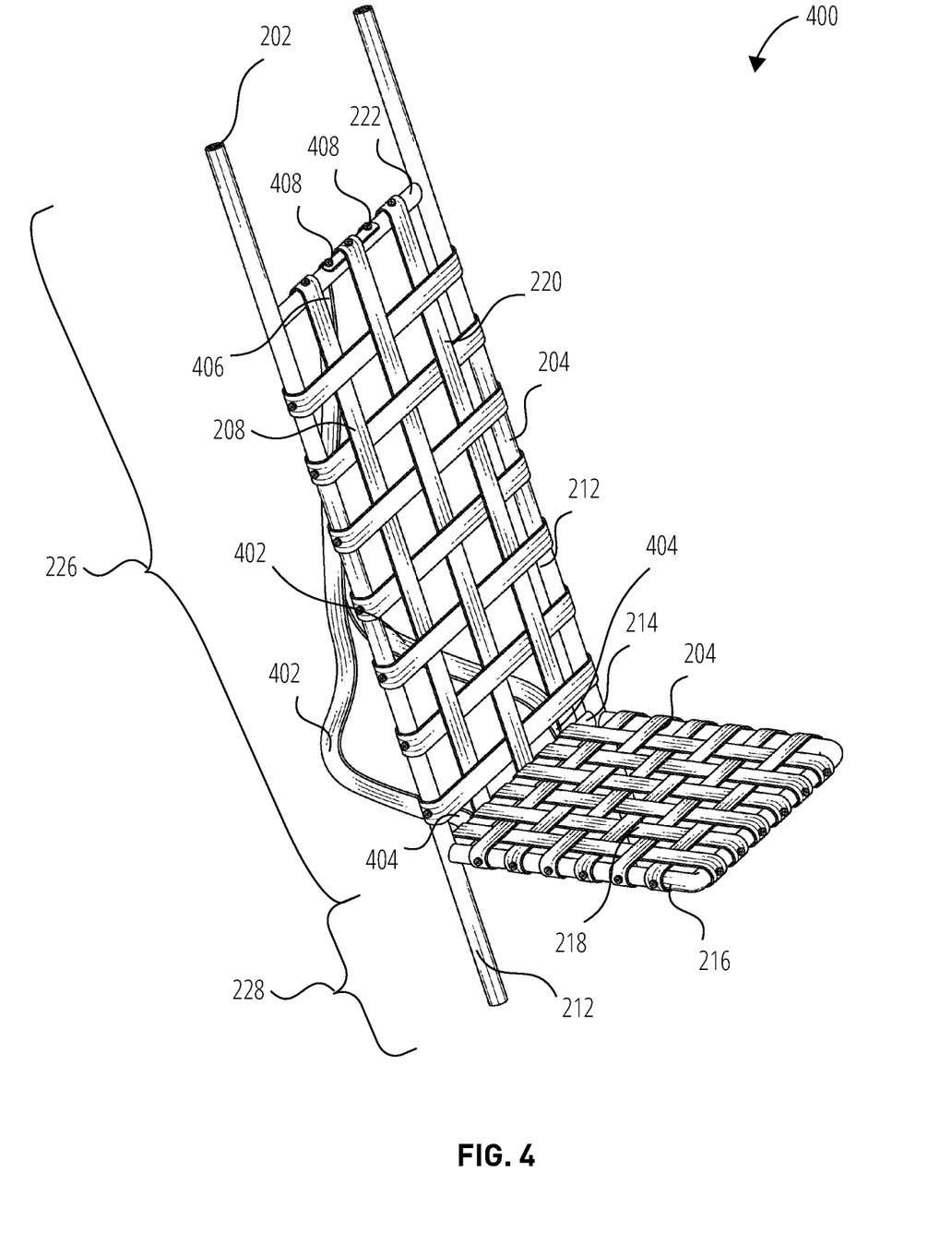
FIG. 4 is a front perspective view of a hunting chair having backpack straps, according to an example embodiment.

FIG. 4 is a front perspective view 400 of a hunting chair 202 having backpack straps, according to an example embodiment. The hunting chair 202 may include backpack straps 402. The backpack straps 402 may be used for wearing the hunting chair 202 on the back.

Each of the backpack straps 402 may have a first end 404 and a second end 406. In an example embodiment, the backpack straps 402 may be coupled by their first ends 404 to the at least one cross rail 214 of the hunting chair 202. In a further example embodiment, one of the backpack straps 402 may be coupled by its first end 404 to one of the two legs 212 and another one of the backpack straps 402 may be coupled by its first end 404 to another one of the two legs 212. The second ends 406 of the backpack straps 402 may be coupled to the crossbar 222 of the hunting chair 202. One or more fasteners 408 may be used to attach the first ends 404 to the at least one cross rail 214 or the two legs 212 and attach the second ends 406 of the backpack straps 402 to the crossbar 222. In an example embodiment, the backpack straps 402 may be made of a non-stretchable material, such as textile, leather, cloth, and so forth.

In an example embodiment, the two legs 212 may include an upper portion 226 and a lower portion 228. The height of the upper portion 226 may be approximately equal or correspond to an average human back height. The height of the lower portion 228 may be approximately equal or correspond to an average human knee height.

Figure 5:
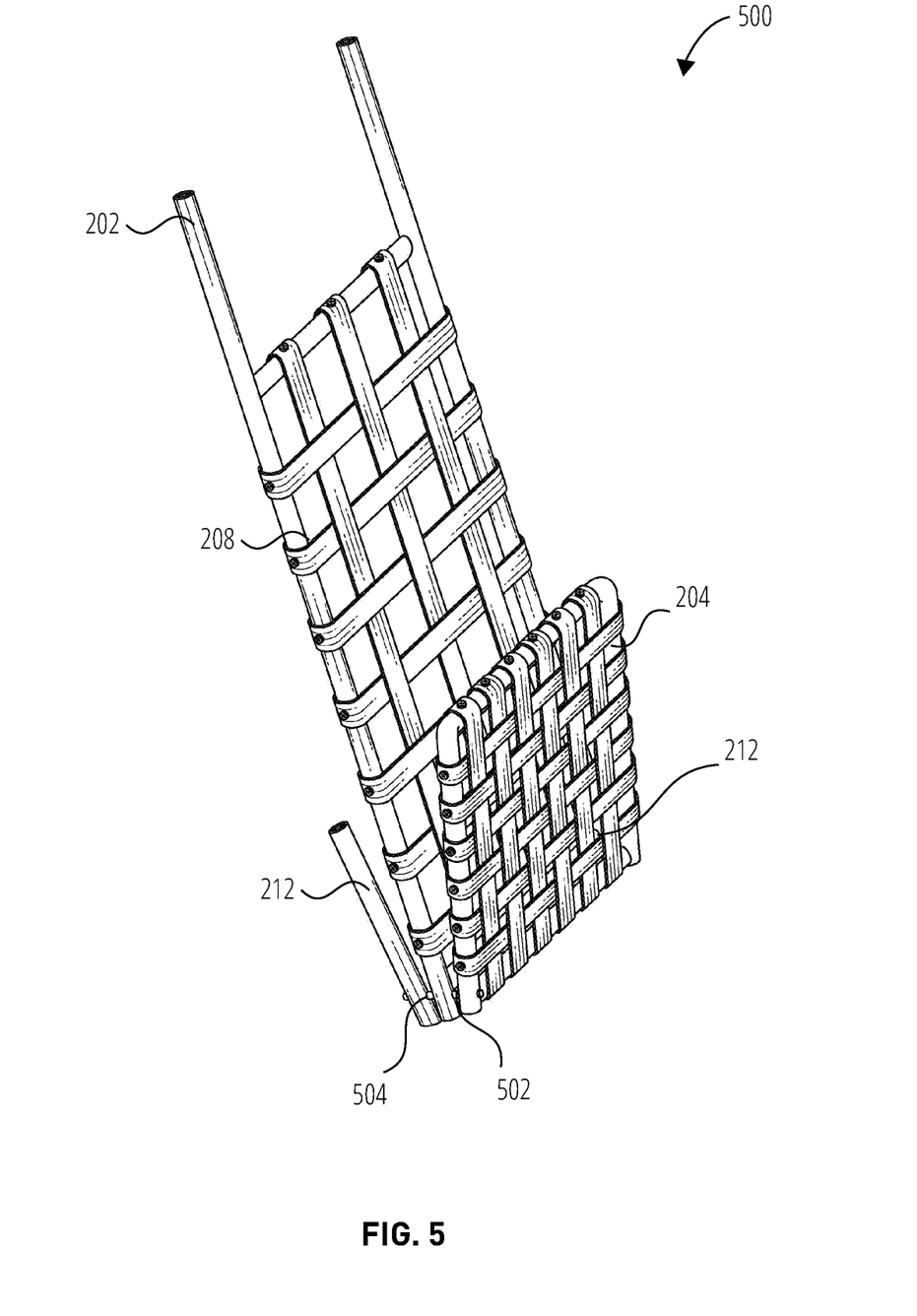
FIG. 5 is a front perspective view of a hunting chair with a seat and legs in a folded position, according to an example embodiment.

FIG. 5 is a front perspective view 500 of a hunting chair 202 with a seat and legs in a folded position, according to an example embodiment. The seat 204 of the hunting chair 202 may be foldable. Specifically, the seat 204 may be foldable towards the back support 208 of the hunting chair 202. The seat 204 may have a folding element 502 configured to fold the seat 204 to the back support 208. In some embodiment, the folding element 502 may be configured to fix the seat 204 in a folded position.

In some example embodiments, the two legs 212 of the hunting chair 202 may be foldable. Specifically, the two legs 212 may be foldable towards the back support 208 of the hunting chair 202. The two legs 212 may have a folding element 504 configured to fold the two legs 212 to the back support 208. In some embodiment, the folding element 504 may be further configured to fix the two legs 212 in a folded position.

In some example embodiments, the two legs 212 of the hunting chair 202 may be telescopic. The telescopic two legs 212 may be configured to slide from an extended position (an operating position for sitting of a person on the hunting chair 202) to a retracted position (a transportation position).

The folded position of the seat 204 and the folded position of the two legs 212 (or the retracted position of the two legs 212) may be used for transportation purposes. For example, the seat 204 and the two legs 212 may be in the folded position (or retracted) when a person wears the hunting chair 202 on the back of the person using backpack straps (shown in FIG. 4).

Figure 6:
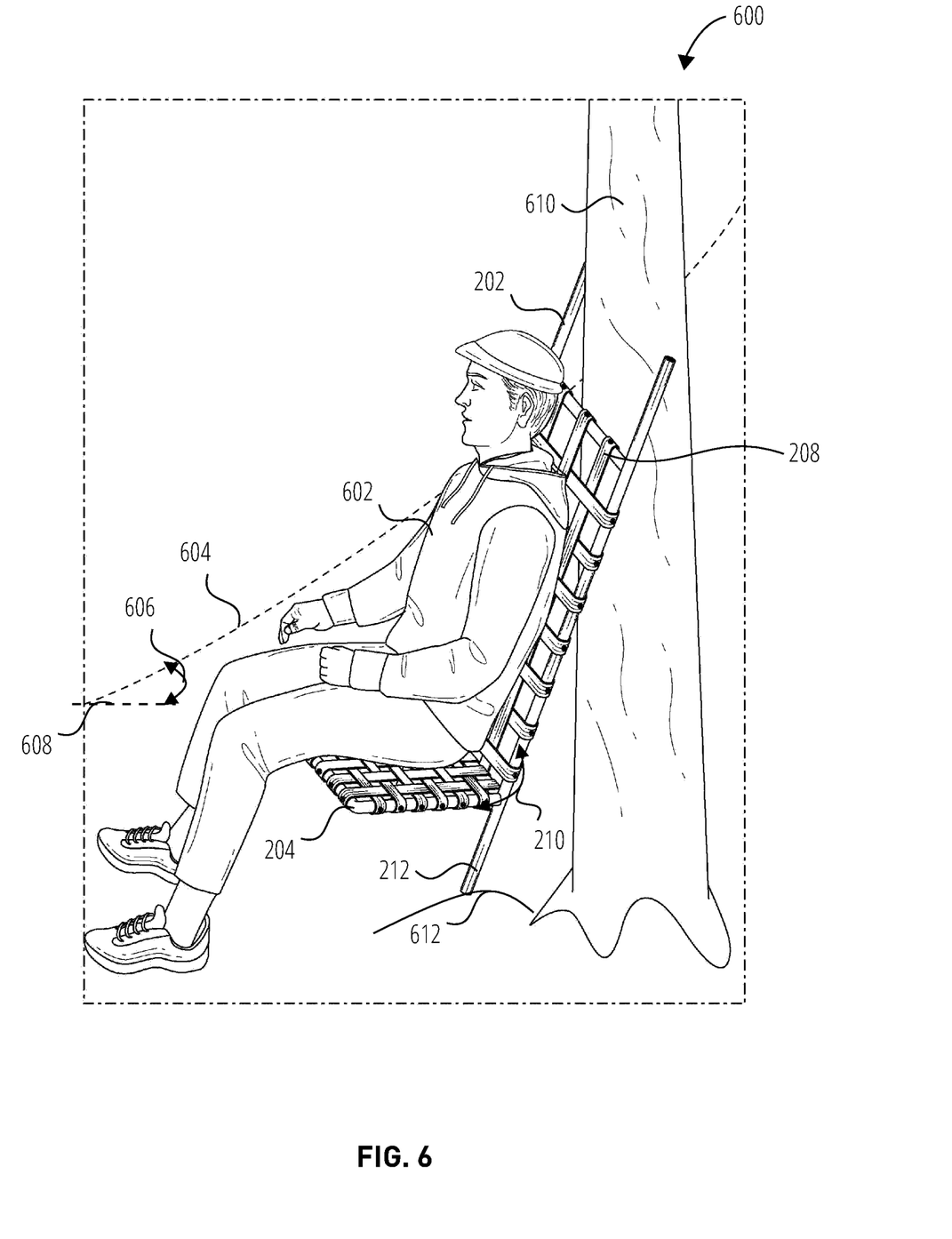
FIG. 6 is a general view of a hunting chair leaned against an object on a slope surface, according to an example embodiment.

FIG. 6 is a general view 600 of a hunting chair 202 leaned against an object on a slope surface, according to an example embodiment. Due to having two legs 212 and due to connection of the seat 204 to the back support 208 at a predetermined angle 210, the hunting chair 202 can be used by a person 602 for sitting on a slope surface 604. The slope surface 604 may have an angle 606 of inclination with respect to a horizontal surface 608. The angle 606 of inclination of the slope surface 604 may include an angle from about 1 to about 45 degrees. In an example embodiment, to accommodate the hunting chair 202 on the slope surface 604, the person 602 may lean the hunting chair 202 against an object 610, such as a tree or a rock. Specifically, the two legs 212 may be placed onto the soil 612 and the back support 208 of the hunting chair 202 may be leaned against the object 610. The two legs 212 standing on the soil 612 and the back support 208 leaned against the object 610 may provide stability for the hunting chair 202 with the person 602 sitting on the hunting chair 202 when the hunting chair 202 is standing on the slope surface 604.

In some embodiments, when the person 602 sits on the hunting chair 202, the two legs 212 may be partially inserted into the soil 612 under the weight of the person 602. This may provide additional stability for the hunting chair 202 when the hunting chair 202 is standing on the slope surface 604.

Figure 7:
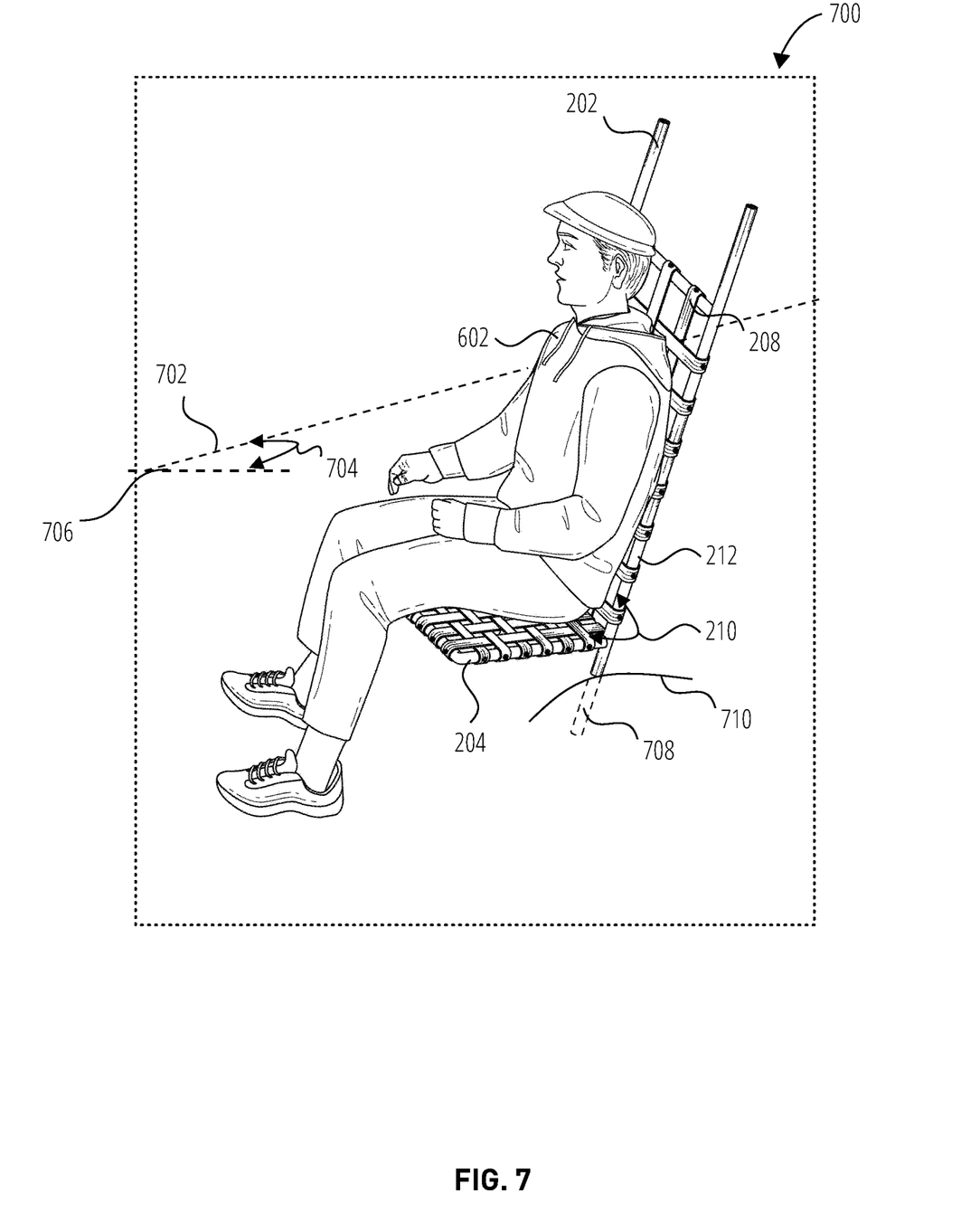
FIG. 7 is a general view of a hunting chair on a slope surface, according to an example embodiment.

FIG. 7 is a general view 700 of a hunting chair used on a slope surface, according to an example embodiment. Due to having two legs 212 and due to the connection of the seat 204 to the back support 208 at a predetermined angle 210, the hunting chair 202 can be used by a person 602 for sitting on a slope surface 702. The slope surface 702 may have an angle 704 of inclination with respect to a horizontal surface 706. In an example embodiment, to accommodate the hunting chair 202 on the slope surface 702, the person 602 may insert a portion 708 of the two legs 212 into the soil 710. Upon having the two legs 212 partially inserted into the soil 710 and due to the predetermined angle 210 of connection of the seat 204 to the back support 208, the hunting chair 202 may steadily stand on the slope surface 702. When the person 602 sits on the hunting chair 202, the two legs 212 may be also inserted into the soil 710 under the weight of the person 602. This may provide additional stability for the hunting chair 202 when the hunting chair 202 is positioned on the slope surface 702.

The hunting chair 202 may be applicable for any kind of hunting, such as turkey hunting, deer hunting, squirrel hunting, and any hunting application where a person is going to be sitting for some time on a slope surface or an even surface.

Figure 8:
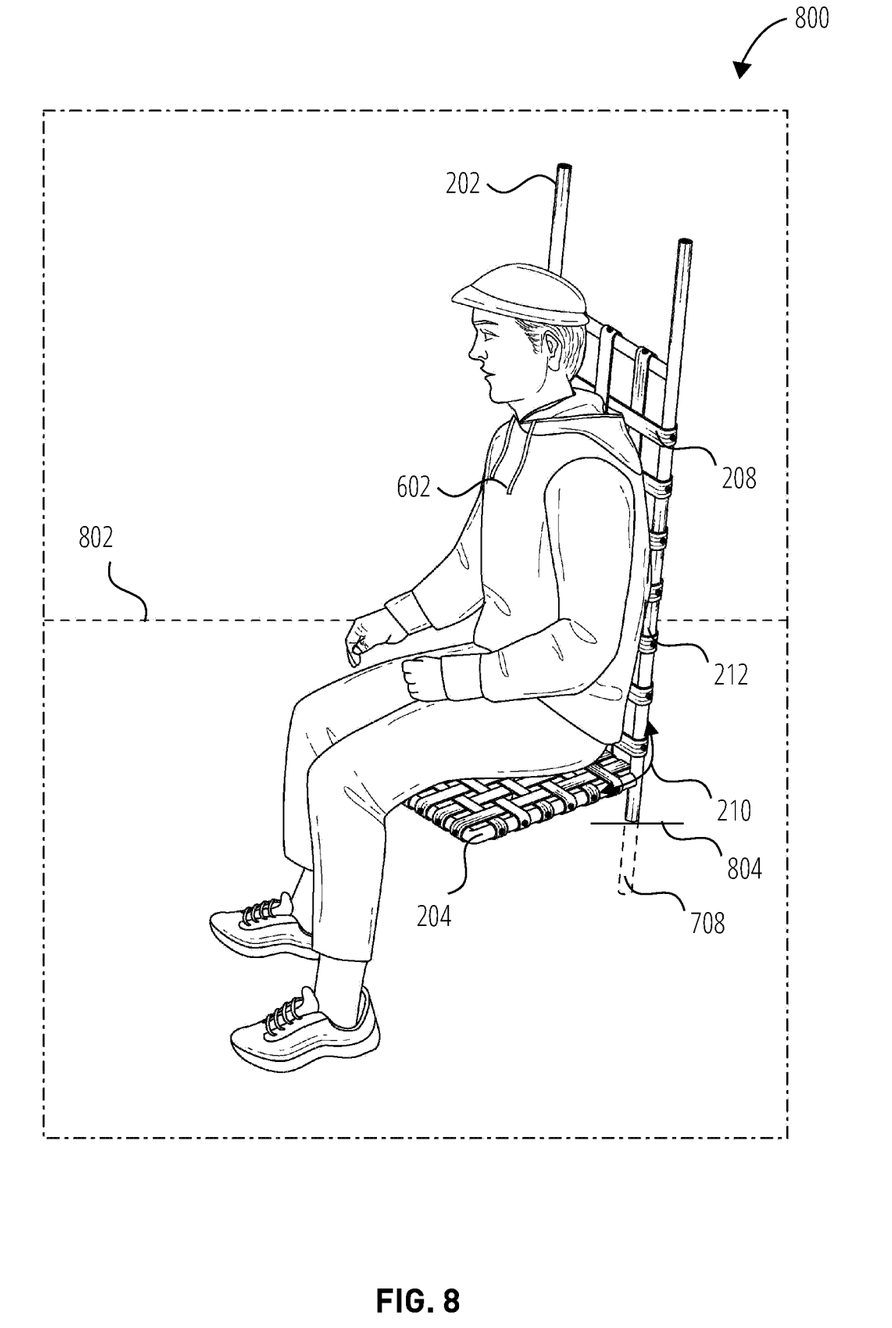
FIG. 8 is a general view of a hunting chair on an even surface, according to an example embodiment.

FIG. 8 is a general view 800 of a hunting chair 202 used on an even surface, according to an example embodiment. Due to having two legs 212 and due to connection of the seat 204 to the back support 208 at a predetermined angle 210, the hunting chair 202 can be used by a person 602 for sitting on an even surface 802. The even surface 802 may be a horizontal surface. In an example embodiment, to accommodate the hunting chair 202 on the even surface 802, the person 602 may insert a portion 708 of the two legs 212 into the soil 804. Upon having the two legs 212 partially inserted into the soil 804 and due to the predetermined angle 210 of connection of the seat 204 to the back support 208, the hunting chair 202 may steadily stand on the even surface 802. When the person 602 sits on the hunting chair 202, the two legs 212 may be additionally inserted into the soil 804 under the weight of the person 602. This may provide additional stability for the hunting chair 202 when the hunting chair 202 is standing on the even surface 802.

Figure 9:
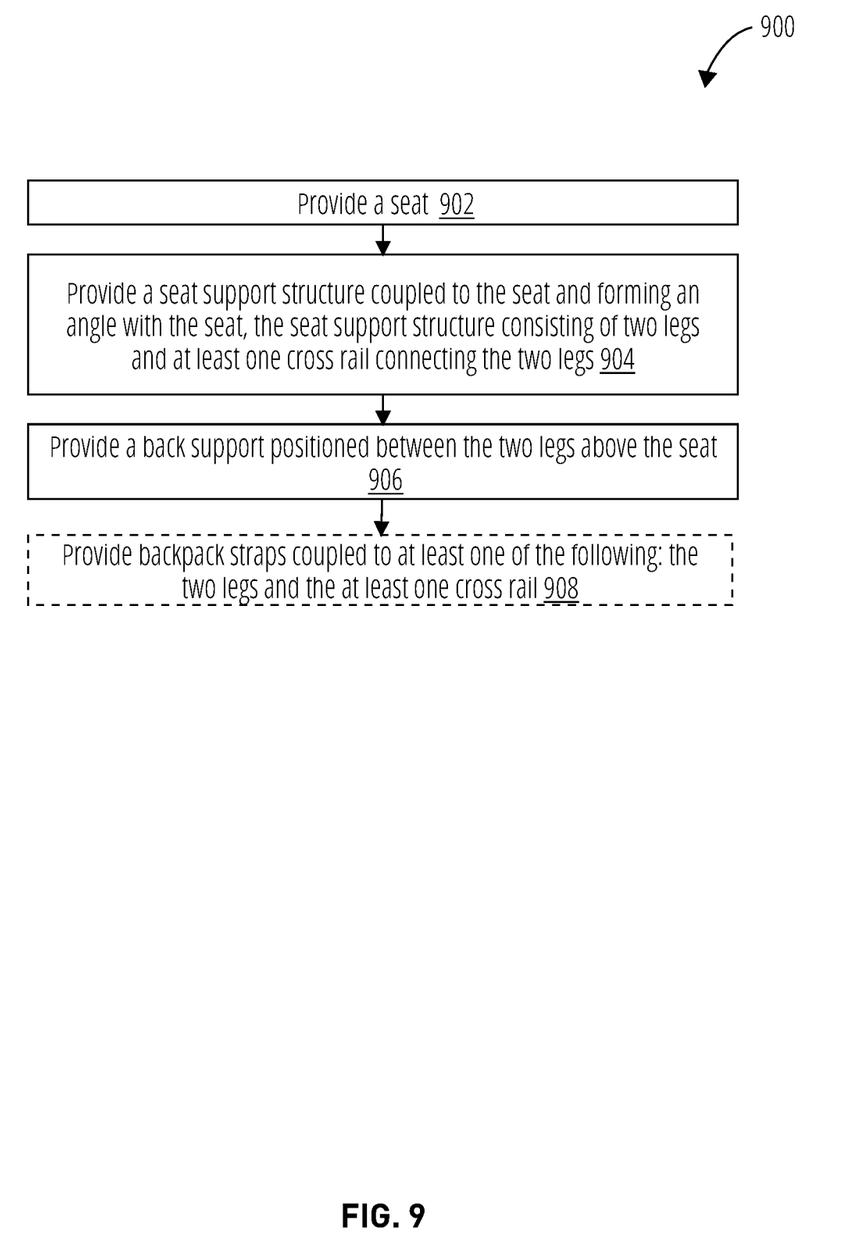
FIG. 9 is a flow chart of a method for manufacturing a hunting chair, in accordance with an example embodiment.

FIG. 9 is a flow chart illustrating a method 900 for manufacturing a hunting chair, in accordance with some example embodiments. In some embodiments, the operations may be combined, performed in parallel, or performed in a different order. The method 900 may also include additional or fewer operations than those illustrated.

The method 900 may commence in block 902 with providing a seat. The seat may include a frame and a textile stretched onto the frame. In an example embodiment, the seat may be foldable to a seat support structure.

In block 904, method 900 may continue with providing the seat support structure. The seat support structure may be coupled to the seat and may form an angle with the seat. The seat support structure may consist of two legs and at least one cross rail connecting the two legs. In an example embodiment, the two legs may be foldable to the seat support structure.

In an example embodiment, the two legs and the at least one cross rail may include tubes. The tubes may be made of a metallic material covered by a rubber material. As the metallic material may make noise when hit or impacted by objects, covering the metallic material with the rubber material may make the material of the hunting chair noiseless. In another example embodiment, the tubes may be made of a composite polymer material, which may also be a noiseless material. The composite polymer material may include, for example, an acrylonitrile-acrylic rubber-styrene copolymer. Using noiseless materials for the hunting chair may be useful in hunting to avoid alerting an animal to the presence of the hunter.

In block 906, the method 900 may continue with providing a back support. The back support may be positioned between the two legs above the seat. In an example embodiment, the back support may include a textile webbing. In another example embodiment, the back support may include a solid stretchable textile material.

In an example embodiment, the method 900 may optionally include providing a crossbar. The crossbar may be connected to each of the two legs in an upper portion of the two legs, and the at least one cross rail may be connected to each of the two legs in a lower portion of the two legs.

In an example embodiment, the method 900 may optionally include providing backpack straps as shown in block 908. The backpack straps may be coupled by their first ends to the two legs or the at least one cross rail and may be coupled by their second ends to the crossbar.

Figure 10:
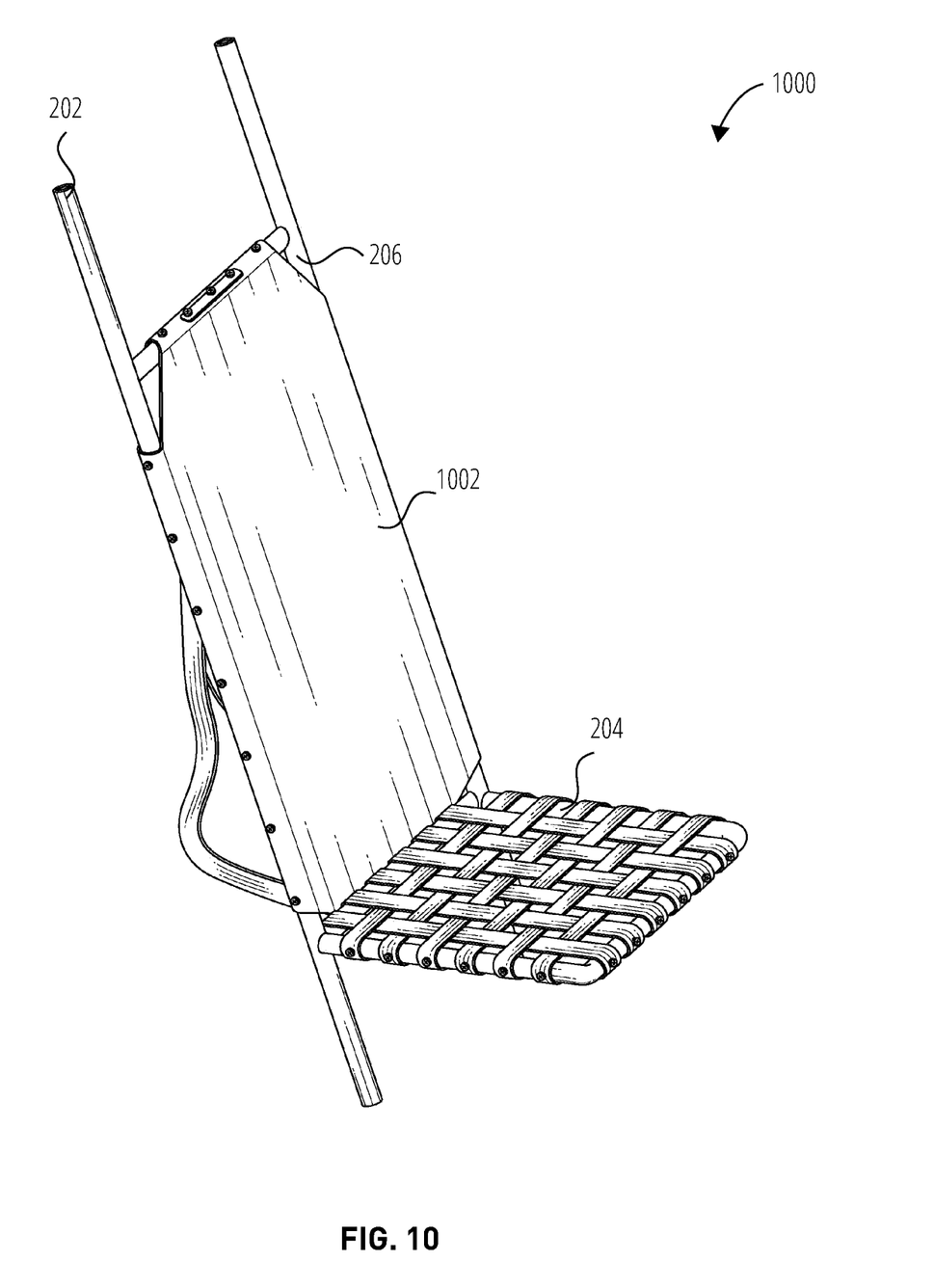
FIG. 10 is a front perspective view of a hunting chair having a back support made of a solid stretchable textile material, according to an example embodiment.

FIG. 10 is a front perspective view 1000 of a hunting chair having a back support made of a solid stretchable textile material, according to an example embodiment. A hunting chair 202 may include a seat 204, a seat support structure 206, and a back support. The back support may include a solid stretchable textile material 1002.

Thus, hunting chairs and methods for manufacturing hunting chairs are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A hunting chair comprising:
  a seat;

a seat support structure coupled to the seat at an angle, the seat support structure consisting of two legs and at least one cross rail connecting the two legs, wherein the two legs are foldable; and a back support positioned between the two legs above the seat.

2. The hunting chair of claim 1, wherein the seat is foldable to the seat support structure.

3. The hunting chair of claim 1, wherein the seat includes a frame and a textile stretched onto the frame.

4. The hunting chair of claim 1, wherein the back support includes a textile webbing.

5. The hunting chair of claim 1, wherein the back support includes a solid stretchable textile material.

6. The hunting chair of claim 1, wherein the two legs and the at least one cross rail include tubes.

7. The hunting chair of claim 6, wherein the tubes are made of a metallic material covered by a rubber material.

8. The hunting chair of claim 6, wherein the tubes are made of a composite polymer material.

9. The hunting chair of claim 1, further comprising backpack straps coupled to at least one of the following: the two legs and the at least one cross rail.

10. A method for manufacturing a hunting chair, the method comprising:

providing a seat;

providing a seat support structure coupled to the seat and forming an angle with the seat, the seat support structure consisting of two legs and at least one cross rail connecting the two legs, wherein the two legs are foldable; and providing a back support positioned between the two legs above the seat.

11. The method of claim 10, wherein the seat is foldable to the seat support structure.

12. The method of claim 10, wherein the seat includes a frame and a textile stretched onto the frame.

13. The method of claim 10, wherein the back support includes a textile webbing.

14. The method of claim 10, wherein the back support includes a solid stretchable textile material.

15. The method of claim 10, wherein the two legs and the at least one cross rail include tubes.

16. The method of claim 15, wherein the tubes are made of a metallic material covered by a rubber material.

17. The method of claim 15, wherein the tubes are made of a composite polymer material.

18. The method of claim 10, further comprising providing backpack straps coupled to at least one of the following: the two legs and the at least one cross rail.

* * * * *